(12) United States Patent
Kobayashi (10) Patent No.: US 9,488,834 B2
(45) Date of Patent: Nov. 8, 2016

(54) PROJECTOR

(71) Applicant: Funai Electric Co., Ltd., Osaka (JP)

(72) Inventor: Tomohiro Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/221,743

(22) Filed: Mar. 21, 2014

(65) Prior Publication Data

US 2014/0293435 A1    Oct. 2, 2014

(30) Foreign Application Priority Data

Mar. 29, 2013  (JP) .................................. 2013-071483

(51) Int. Cl.
G02B 26/00    (2006.01)
G02B 27/14    (2006.01)
G03B 21/00    (2006.01)
(Continued)

(52) U.S. Cl.
CPC ....... *G02B 27/0101* (2013.01); *G02B 21/0032* (2013.01); *G02B 27/14* (2013.01); *G03B 21/005* (2013.01); *G03B 21/008* (2013.01); *G03B 21/208* (2013.01); *H04N 9/3129* (2013.01); *G02B 27/283* (2013.01); *G03B 21/2053* (2013.01); *G03B 21/2066* (2013.01); *G03B 21/28* (2013.01); *H04N 9/3105* (2013.01); *H04N 9/3152* (2013.01)

(58) Field of Classification Search
CPC .......... G02B 21/0032; G02B 21/0046; G02B 26/0833; G02B 26/0841; G02B 27/0101; G02B 27/0149; G02B 27/14; G02B 27/283; G02B 26/10; G09G 5/10; G03B 21/00; G03B 21/005; G03B 21/008; G03B 21/2053; G03B 21/2066; G03B 21/208; G03B 21/28; H04N 9/3105; H04N 9/3129; H04N 9/3152; H04N 9/3167; G01N 21/6458
USPC ....... 359/630–634, 636, 290, 291, 368, 487; 353/13, 20, 31, 88, 97; 348/294, 335; 349/62, 95; 345/690; 250/208.1, 216
See application file for complete search history.

(56) References Cited

U.S. PATENT DOCUMENTS 5,729,242 A    3/1998  Margerum et al.
7,002,736 B2 *  2/2006  Fukuyama et al. ........... 359/368

(Continued)

FOREIGN PATENT DOCUMENTS

JP    2004-226631 A    8/2004
JP    2008-032809 A    2/2008

OTHER PUBLICATIONS

Extended European Search Report for Application No. 14160998.2, mailed on Aug. 20, 2014 (5 pages).

*Primary Examiner* — Loha Ben
(74) *Attorney, Agent, or Firm* — Osha Liang LLP (57) ABSTRACT

A projector for projecting an image includes a light source that outputs light; a reflecting member that reflects the light from the light source; and a diaphragm member with an aperture that restricts a range of flux of either an incident light incident to the reflecting member or a reflected light reflected by the reflecting member. The aperture may penetrate through the diaphragm member along a direction of thickness of the diaphragm member. The diaphragm member may be arranged so as to not block the other of the incident light or the reflected light, and a direction perpendicular to the direction of thickness may be oblique with respect to an optical path of either the incident light or the reflected light.

14 Claims, 10 Drawing Sheets

(51) Int. Cl.
  *G03B 21/14* (2006.01)
  *G02B 27/01* (2006.01)
  *G02B 21/00* (2006.01)
  *G02B 27/28* (2006.01)
  *G03B 21/20* (2006.01)
  *H04N 9/31* (2006.01)
  *G03B 21/28* (2006.01)

(56) References Cited

U.S. PATENT DOCUMENTS

| | | | |
|---|---|---|---|
| 7,428,027 B2 * | 9/2008 | Takayama | 349/95 |
| 7,483,200 B1 * | 1/2009 | Pan | 359/291 |
| 2003/0202259 A1 | 10/2003 | Nishimae et al. | |
| 2009/0033887 A1 | 2/2009 | Lin et al. | |
| 2011/0234928 A1 | 9/2011 | Masuda et al. | |

* cited by examiner

PROJECTOR

BACKGROUND ART

One known type of projector that projects a colored image on a projection surface is one which synthesizes, for example, red laser light (R), green laser light (G) and blue laser light (B), and projects it on a projection surface (for example, refer to Patent Literature 1). This projector is used in practice for a head-up display (HUD), for example. A head-up display is something that allows a driver to see a virtual image overlapping the scene ahead of the windshield of an automobile or the like by means of a combiner (translucent reflecting member) provided on the windshield reflecting toward the driver an image projected from a projector.

In such a projector, a plate-shaped diaphragm member is arranged on the optical path of the laser light to remove stray radiation of the laser light that causes decreased quality of the projected image. Stray light is laser light that advances along a different optical path than the optical path of the laser light for projecting the image. In the diaphragm member, an aperture (opening) which penetrates through the diaphragm member in the direction of thickness of the diaphragm member is provided. When the laser light passes through the aperture, the range of flux of the laser light is restricted by the aperture, thereby enabling removal of stray light of the laser light.

PATENT LITERATURE

[Patent Literature 1] Japanese Unexamined Patent Application Publication No. 2004-226631

However, in the conventional projector described above, the diaphragm member is arranged so as to be substantially perpendicular to the optical path of the laser light incident to the aperture. For this reason, if the diaphragm member is arranged on the optical path of the laser light reflected by a minor, a relatively large space must be assured between the diaphragm member and the minor so that the diaphragm member does not block the light incident to the mirror. As a result, the dead space produced between the diaphragm member and the minor is large, and the projector ends up being larger.

SUMMARY OF THE INVENTION

One or more embodiments of the present invention relate, in part, to a projector that can be reduced in size.

A projector according to one or more embodiments of the present invention may comprise a light source that outputs light; a reflecting member that reflects the light from the light source; and a diaphragm member having an aperture that restricts a range of flux of either an incident light incident to the reflecting member or a reflected light reflected by the reflecting member, wherein the aperture penetrates through the diaphragm member along a direction of thickness of the diaphragm member, the diaphragm member is arranged so as to not block the other of the incident light or the reflected light, and a direction perpendicular to the direction of thickness is oblique with respect to an optical path of either the incident light or the reflected light.

According to one or more embodiments, for example, the diaphragm member is arranged such that the direction substantially perpendicular to the direction of thickness is substantially parallel to the optical path of the other of either the incident light or reflected light. As a result, for example, the space to be assured between the diaphragm member and reflecting member can be held to a minimum, and the projector can be reduced in size. Additionally, as described above, because the direction substantially perpendicular to the direction of thickness may be oblique with respect to the optical path of either the incident light or reflected light, the amount of adjustment of the aperture position with respect to the reflected light is smaller than the amount of adjustment of the diaphragm member position. As a result, for example, the position of the diaphragm member can be adjusted with good precision. In this specification, "penetrating through the diaphragm member along the direction of thickness of the diaphragm member" is a concept that includes not only the case of penetrating through the diaphragm member substantially in parallel to the direction of thickness of the diaphragm member, but also the case of penetrating through the diaphragm member at an oblique angle with respect to the direction of thickness of the diaphragm member.

For example, according to one or more embodiments of the present invention, the diaphragm member may be arranged so that a direction perpendicular to the direction of thickness is parallel to the optical path of the other of the incident light or reflected light.

According to one or more embodiments, the diaphragm member is arranged such that the direction substantially perpendicular to the direction of thickness is substantially parallel to the optical path of the other of either the incident light or reflected light. As a result, for example, the diaphragm member can be arranged so as not to block the other of either the incident light or reflected light.

For example, according to one or more embodiments, the diaphragm member may comprise: a first surface on a side where either the incident light or the reflected light is incident to the aperture, and a second surface on a side where either the incident light or the reflected light is output from the aperture, wherein the aperture is a long hole with a long direction along the optical path of either the incident light or the reflected light, the range of flux of either the incident light or the reflected light is restricted by an edge on the side of the first surface of a first end in the long direction of the aperture, and the range of flux is restricted by an edge on the side of the second surface of a second end in the long direction of the aperture.

According to one or more embodiments, for example, because the aperture is a long hole which is long in the direction along the optical path of either the incident light or reflected light, the range of flux of either the incident light or reflected light is restricted by the edges of the first end and the second end of the aperture.

For example, according to one or more embodiments, the aperture extends, parallel to the direction of thickness, from the first surface to the second surface.

According to one or more embodiments, for example, because the aperture extends from the first surface to the second surface substantially in parallel to the direction of thickness, the position of the aperture with respect to the reflected light is easy to adjust.

For example, according to one or more embodiments, the diaphragm member adjusts an angle of obliqueness with respect to the optical path of either the incident light or the reflected light that is perpendicular to the direction of thickness.

According to one or more embodiments, for example, because the angle of obliqueness with respect to the optical path of either the incident light or reflected light of the direction substantially perpendicular to the direction of thickness can be adjusted, the position of the diaphragm member can be adjusted with even better precision.

For example, a projector according to one or more embodiments of the present invention may further comprise a MEMS minor that reflects reflected light reflected by the reflecting member, wherein the diaphragm member is arranged between the reflecting member and the MEMS minor on the optical path of the reflected light, the diaphragm member is arranged so as to not block the incident light, and the direction perpendicular to the direction of thickness is oblique with respect to the optical path of the reflected light.

According to one or more embodiments, if a MEMS mirror is arranged, the space to be assured between the MEMS minor and reflecting member can be held to a minimum.

According to the projector according to one or more embodiments of the present invention, the space to be assured between the diaphragm member and reflecting member can be held to a minimum, and the projector can be reduced in size.

DETAILED DESCRIPTION OF EMBODIMENTS

A projector according to one or more embodiments of the present invention will be described in detail below using the drawings. The one or more embodiments described below all are examples of the present invention. The numeric values, shapes, materials, arrangement positions and connection states of the constituent elements and so forth shown below are examples, and are not intended to limit the present invention. The present invention is to be specified by the claims. Therefore, among the constituent elements in the examples below, constituent elements not described in the independent claims are not necessarily required.

FIRST EXAMPLE

[Overview of Projector]

Figure 1:
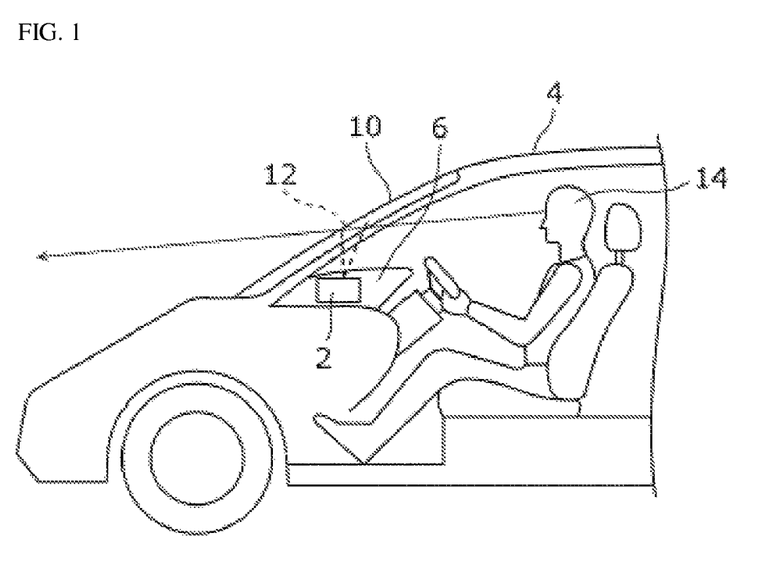
FIG. 1 illustrates a head-up display equipped with a projector according to one or more embodiments of the present invention.
Figure 2:
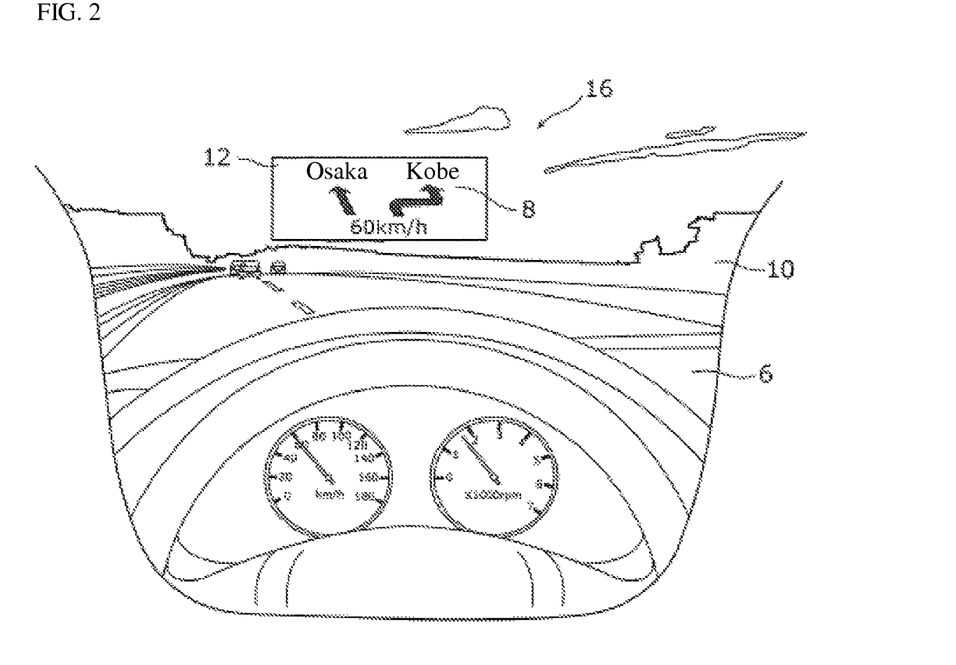
FIG. 2 illustrates an example of an image projected by a projector according to one or more embodiments of the present invention.

First, an overview of the projector pertaining to one or more embodiments will be described while referring to, for example, FIGS. 1 and 2. FIG. 1 illustrates a head-up display equipped with the projector pertaining to one or more embodiments. FIG. 2 illustrates an example of an image projected by the projector pertaining to one or more embodiments.

According to one or more embodiments as shown in FIG. 1, the projector 2 may to be built into, for example, a head-up display. The projector 2 may be installed in, for example, the dashboard 6 of an automobile 4. An image 8 projected from the projector 2 may be reflected toward a driver 14 by a combiner 12 provided on the windshield 10 of the automobile 4. As a result, the driver 14 may be able to see the virtual image 8 overlapping the scene 16 ahead of the windshield 10, as shown in FIG. 2. The image 8 projected on the windshield 10 (also referred to as "projection surface 10" hereinafter) may be, for example, a speedometer display and a road turn guidance display, etc.

[Overall Configuration of Projector]

Figure 3:
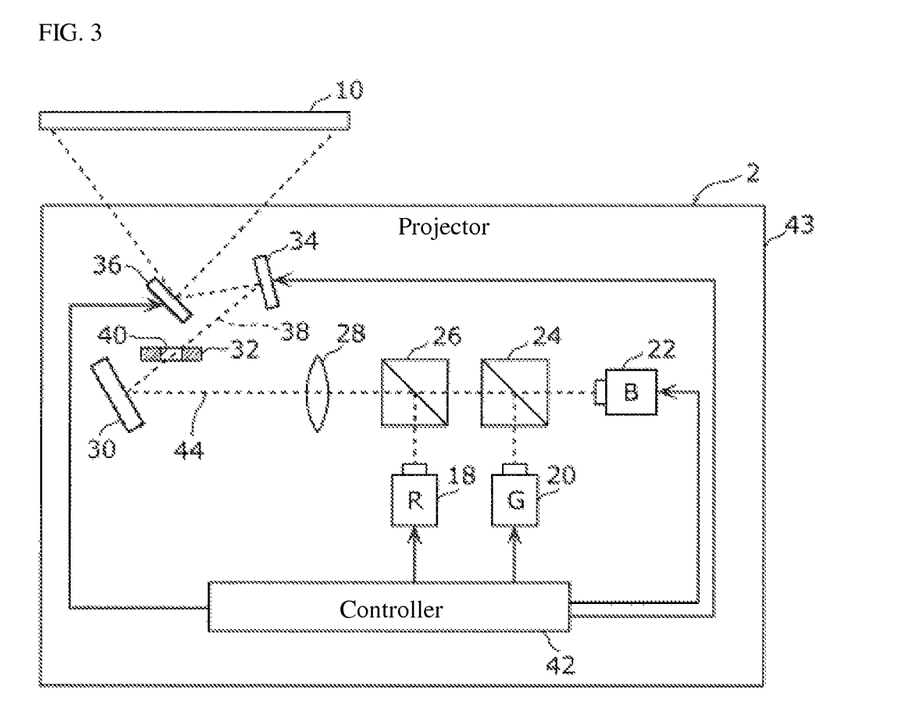
FIG. 3 schematically illustrates the configuration of a projector according to one or more embodiments of the present invention.
Figure 4:
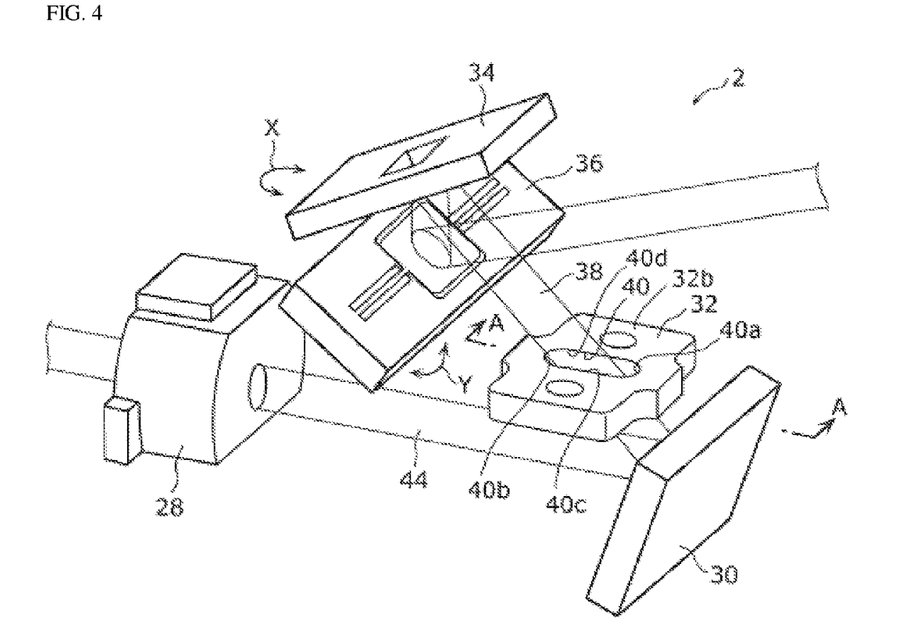
FIG. 4 is an oblique view illustrating part of the configuration of a projector according to one or more embodiments of the present invention.

Next, the overall configuration of the projector pertaining to one or more embodiments will be described while referring to FIGS. 3 and 4. FIG. 3 schematically illustrates the configuration of the projector pertaining to one or more embodiments. FIG. 4 is an oblique view illustrating part of the configuration of the projector pertaining to one or more embodiments.

The projector 2 in one or more embodiments is a laser projector that may project the color image 8 on the projection surface 10 by synthesizing red laser light (R), green laser light (G) and blue laser light (B) (each of these laser beams individually constitutes light), and projecting it on the projection surface 10.

According to one or more embodiments as shown in FIG. 3, the projector 2 has a first laser light source 18, a second laser light source 20, a third laser light source 22 (each of these first laser light source 18, a second laser light source 20 and a third laser light source 22 individually constitutes a light source), a first dichroic mirror 24 and a second dichroic mirror 26.

The first laser light source 18, second laser light source 20 and third laser light source 22 may each be laser diodes (LDs) that output monochromatic laser light of a specified wavelength. For example, the first laser light source 18 outputs red laser light, the second laser light source 20 outputs green laser light and the third laser light source 22 outputs blue laser light.

The first dichroic minor 24 and the second dichroic mirror 26 each may have the optical property of reflecting laser light of specified wavelengths and transmitting laser light of other wavelengths. For example, the first dichroic mirror 24 may reflect only green laser light and transmit laser light of other colors. The second dichroic mirror 26 may reflect only red laser light and transmit laser light of other colors.

The first dichroic minor 24 may be arranged on the upstream side of the optical path of the laser light, and the second dichroic minor 26 may be arranged on the downstream side of the optical path of the laser light. Green laser light from the second laser light source 20 may be reflected by the first dichroic mirror 24, and blue laser light from the third laser light source 22 may be transmitted by the first dichroic mirror 24. As a result, green laser light and blue laser light may be synthesized in the first dichroic mirror 24.

Additionally, red laser light from the first laser light source 18 may be reflected by the second dichroic minor 26, and the green laser light and blue laser light synthesized as described above may be transmitted by the second dichroic minor 26. As a result, red laser light, green laser light and blue laser light may be synthesized in the second dichroic minor 26.

According to one or more embodiments as shown in FIG. 3 and FIG. 4, the projector 2 also has a lens 28, a minor 30 (which constitutes the reflecting member), a diaphragm member 32, a first MEMS (microelectromechanical systems) minor 34 and a second MEMS mirror 36 (the first MEMS minor 34 and second MEMS mirror 36 individually constitute MEMS minors).

The lens 28 may be a condenser lens for condensing the laser light synthesized in the second dichroic minor 26 described above. The mirror 30 may be a minor for reflecting the laser light condensed by the lens 28 toward the first MEMS minor 34.

The diaphragm member 32 may be arranged between the mirror 30 and the first MEMS minor 34 on optical path L1 (refer to FIG. 5 to be described later) of the reflected light 38, which may be the laser light reflected by the minor 30. The diaphragm member 32 may be configured in a plate shape, and may have an aperture 40 that restricts the range of flux of the reflected light 38. By the reflected light 38 passing through the aperture 40, stray light 50 contained in the reflected light 38 (refer to FIG. 5 to be described later) may be removed. In the projector 2 of according to one or more embodiments, the configuration and arrangement of the diaphragm member 32 each may have characteristics. The configuration and arrangement of the diaphragm member 32 will be described later.

As indicated by arrows X in FIG. 4, the first MEMS minor 34 may be scanned at a relatively high speed in the horizontal direction. As indicated by arrows Y in FIG. 4, the second MEMS minor 36 may be scanned at a relatively high speed in the vertical direction. The first MEMS minor 34 and second MEMS minor 36 each individually may reflect incident laser light in a direction that depends on its own angle of deviation. The reflected light 38 from which stray light 50 was removed by the aperture 40 of the diaphragm member 32 may be reflected by the first MEMS minor 34, and then reflected by the second MEMS minor 36. Because the first MEMS minor 34 and the second MEMS minor 36 are scanned in the horizontal direction and vertical direction, respectively, the laser light projected on the projection surface 10 may be scanned in the horizontal direction and vertical direction, and the image 8 may be projected on the projection surface 10.

As shown FIG. 3, the projector 2 of one or more embodiments of the present invention may also have a controller 42. The controller 42 may control the drive current supplied to each of the first laser light source 18, second laser light source 20 and third light source 22. Additionally, the controller 42 may control the angle of deviation of each of the first MEMS minor 34 and second MEMS minor 36.

According to one or more embodiments, each described constituent element of the projector 2 may be housed in a prescribed arrangement inside a housing 43, for example, as shown in FIG. 3.

[Configuration and Arrangement of Diaphragm Member]

Figure 5:
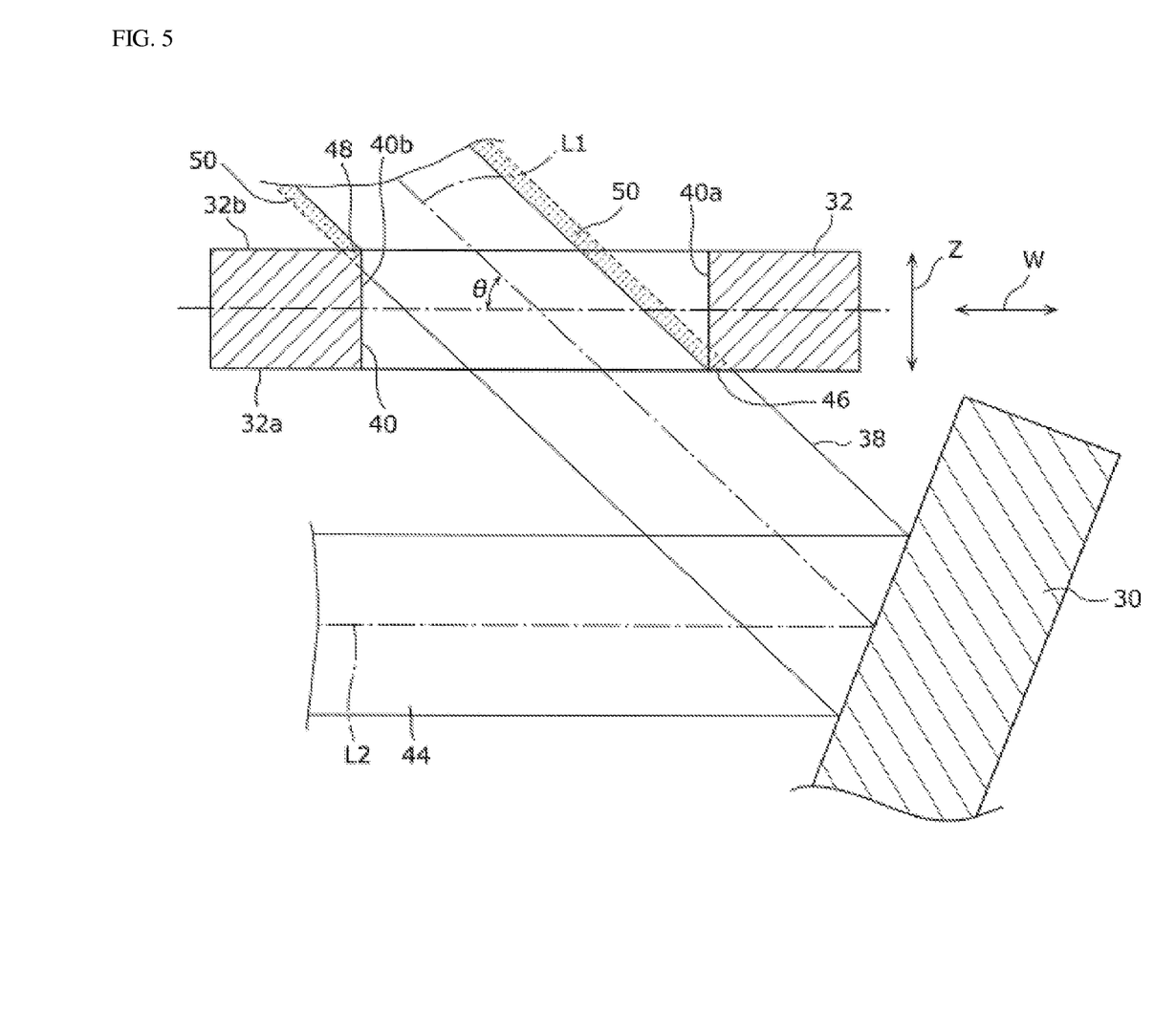
FIG. 5 is a cross-sectional view of key elements illustrating the diaphragm member and minor cut by line A-A in FIG. 4 according to one or more embodiments of the present invention.
Figure 6:
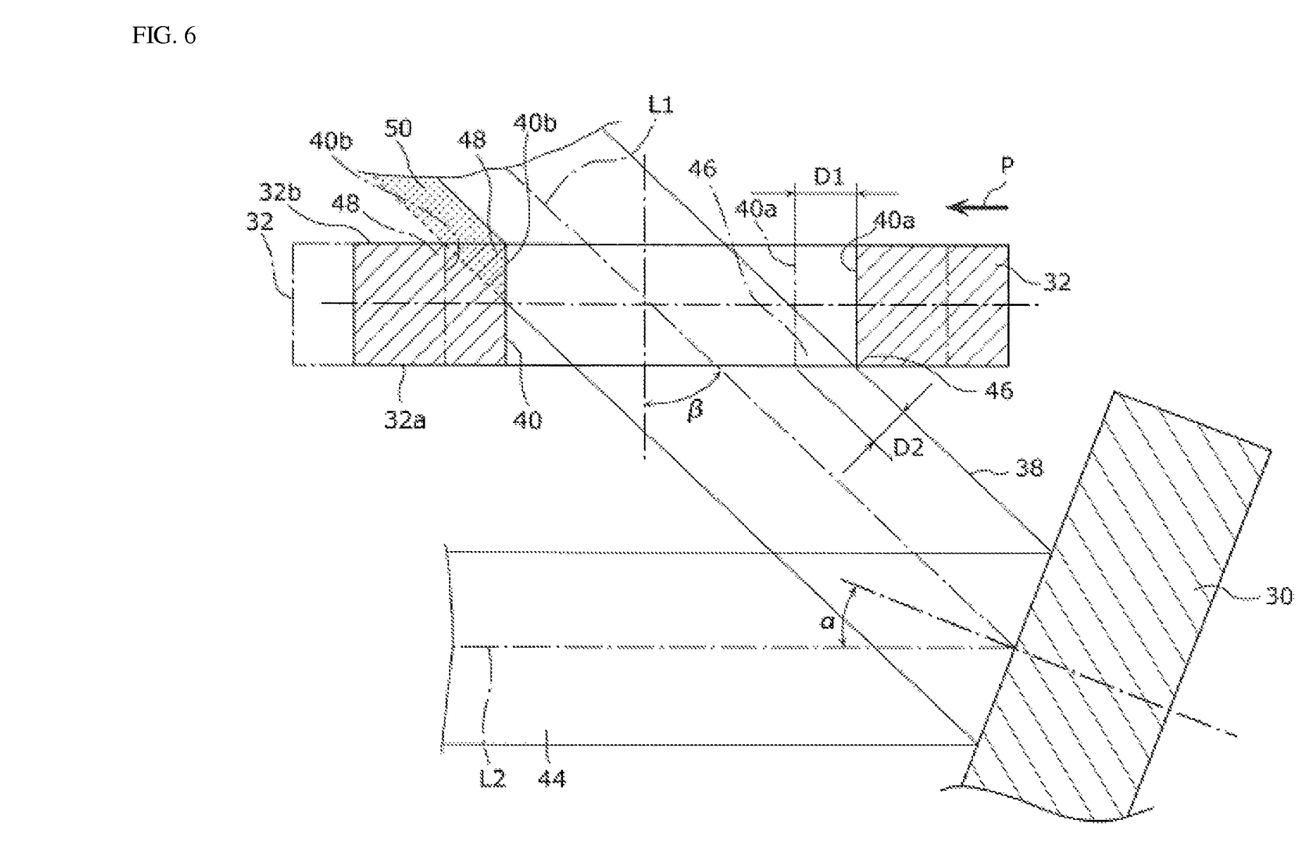
FIG. 6 is a cross-sectional view of key elements for explaining the method for adjusting the position of the diaphragm member according to one or more embodiments of the present invention.

The configuration and arrangement of the above-described diaphragm member 32 will be described while referring to FIGS. 5 and 6. FIG. 5 is a cross-sectional view of key elements illustrating the diaphragm member and mirror cut by line A-A according to one or more embodiments as shown in FIG. 4. FIG. 6 is a cross-sectional view of key elements for explaining the method for adjusting the position of the diaphragm member.

According to one or more embodiments as shown in FIG. 5, the diaphragm member 32 may have a first surface 32a, which is the surface on the side where the reflected light 38 is incident to the aperture 40, and a second surface 32b, which is the surface on the side where the reflected light 38 is output from the aperture 40. The aperture 40 may be a long hole which is long in the direction along the optical path L1 of the reflected light 38. The aperture 40 may extend from the first surface 32a to the second surface 32b penetrating through the diaphragm member 32 substantially in parallel to the direction of thickness of the diaphragm member 32 (direction indicated by arrows Z in FIG. 5).

According to one or more embodiments as shown in FIG. 5, the diaphragm member 32 may be arranged such that the direction substantially perpendicular to its direction of thickness (direction indicated by arrows W in FIG. 5) is oblique by an angle of obliqueness θ (for example, approximately 45°) with respect to the optical path L1 of the reflected light 38. This angle of obliqueness θ0 may be set to an angle such that the diaphragm member 32 does not block incident light 44, which is the laser light incident to the minor 30. In this specification, "oblique" may refer to being arranged slanted at an angle greater than 0° and smaller than 90° with respect to a certain axis. Additionally, according to one or more embodiments as shown in FIG. 5, the diaphragm member 32 may be arranged such that the direction substantially perpendicular to its direction of thickness is substantially parallel to the optical path L2 of the incident light 44.

According to one or more embodiments as shown in FIG. 5, the reflected light 38 reflected by the mirror 30 is incident to the opening on the side of the first surface 32a of the aperture 40, and is then output from the opening on the side of the second surface 32b of the aperture 40 toward the first MEMS mirror 34. In this case, the range of flux of the reflected light 38 may be restricted by the edge 46 on the side of the first surface 32a of the first end 40a in the long direction of the aperture 40, and may be restricted by the edge 48 on the side of the second surface 32b of the second end 40b in the long direction of the aperture 40. In addition, the range of flux of the reflected light 38 may also restricted by the edges (not illustrated) on the side of the first surface 32a of the third end 40c and fourth end 40d in the short direction of the aperture 40. As a result, the stray light 50 contained in the reflected light 38 may be removed.

The projector 2 according to one or more embodiments, because the diaphragm member 32 may be arranged in the manner described above, the position of the diaphragm member 32 may be adjusted with good precision as follows when assembling the projector 2, for example. As shown in one or more embodiments according to FIG. 6, when the incident light 44 is incident to the mirror 30 at angle of incidence α (α<45°), the reflected light 38 may be incident to the aperture 40 at angle of incidence β (=90°−2α). As a result, when the position of the diaphragm member 32 is adjusted by an amount of adjustment D1 in the direction indicated by arrow P in FIG. 6, the position of the edge 46 with respect to the reflected light 38 may be adjusted by an amount of adjustment D2 (=D1 cos β<D1) with respect to the reflected light 38. Therefore, the diaphragm member 32 may be adjusted with good precision because the amount of adjustment D2 of the edge 46 with respect to the reflected light 38 is smaller than the amount of adjustment D1 of the position of the diaphragm member 32.

Next, the effect obtained by the projector 2 according to one or more embodiments will be described. By arranging the diaphragm member 32 as described above, the space to be assured between the diaphragm member 32 and the mirror 30 may be held to a minimum. As a result, the projector 2 may be reduced in size.

EXAMPLE 2

Figure 7:
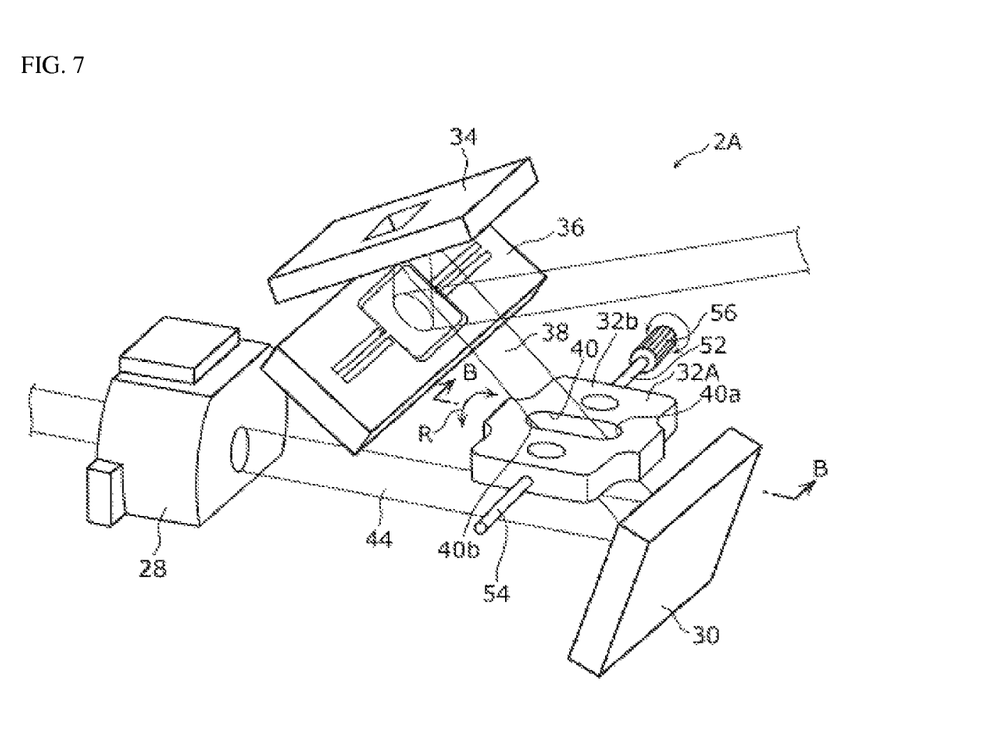
FIG. 7 is an oblique view illustrating part of the configuration of a projector according to one or more embodiments of the present invention.
Figure 8:
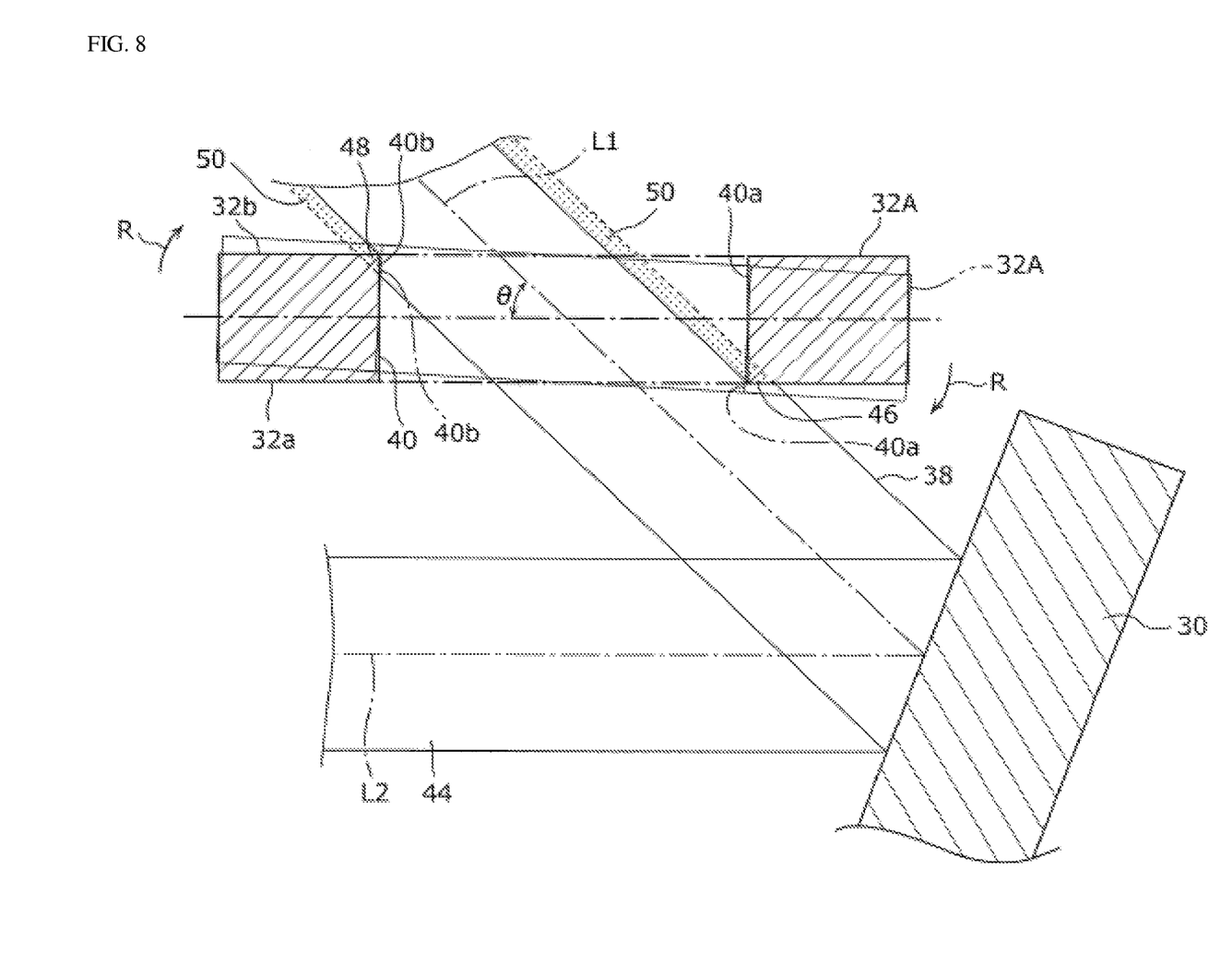
FIG. 8 is a cross-sectional view of key elements illustrating the diaphragm member and minor cut by line B-B in FIG. 7 according to one or more embodiments of the present invention.

Next, the configuration of the projector pertaining to one or more embodiments will be described while referring to FIGS. 7 and 8. FIG. 7 is an oblique view illustrating part of the configuration of the projector pertaining to one or more embodiments. FIG. 8 is a cross-sectional view of key elements illustrating the diaphragm member and mirror cut by line B-B according to one or more embodiments as shown in FIG. 7. In each of the following examples, the same configuring elements as the first example are given the same reference numerals, and their explanations are omitted.

According to one or more embodiments as shown in FIG. 7A, rotating shafts 52 and 54 are respectively provided on the two ends of a diaphragm member 32A of the projector 2A. Each of these rotating shafts 52 and 54 may be supported such that it can rotate on a bearing (not illustrated). Each of the rotating shafts 52 and 54 may be arranged substantially perpendicular to the optical path L1 of the reflected light 38. A knob 56 may be mounted on the tip of the rotating shaft 52. By the knob 56 being turned while being pinched with the fingers, etc., the diaphragm member 32A may be rotated in the direction indicated by arrows R in FIG. 7 centered around the rotating shafts 52 and 54. As a result, the angle of obliqueness θ of the direction substantially perpendicular to the direction of thickness of the diaphragm member 32A with respect to the optical path L1 of the reflected light 38 may be adjusted, according to one or more embodiments as shown in FIG. 8. Further, a locking mechanism (not illustrated), which locks rotation of the knob 56 when adjustment of the angle of obliqueness θ is finished, may be provided on the knob 56.

According to one or more embodiments of the present invention, the following effects can be obtained by the projector 2A. Namely, in addition to adjusting the position of the diaphragm member 32 by the method described in Example 1, the position of the edge 46 with respect to the reflected light 38 may be adjusted with even better precision by adjusting the angle of obliqueness θ by the method described in this example.

EXAMPLE 3

Figure 9:
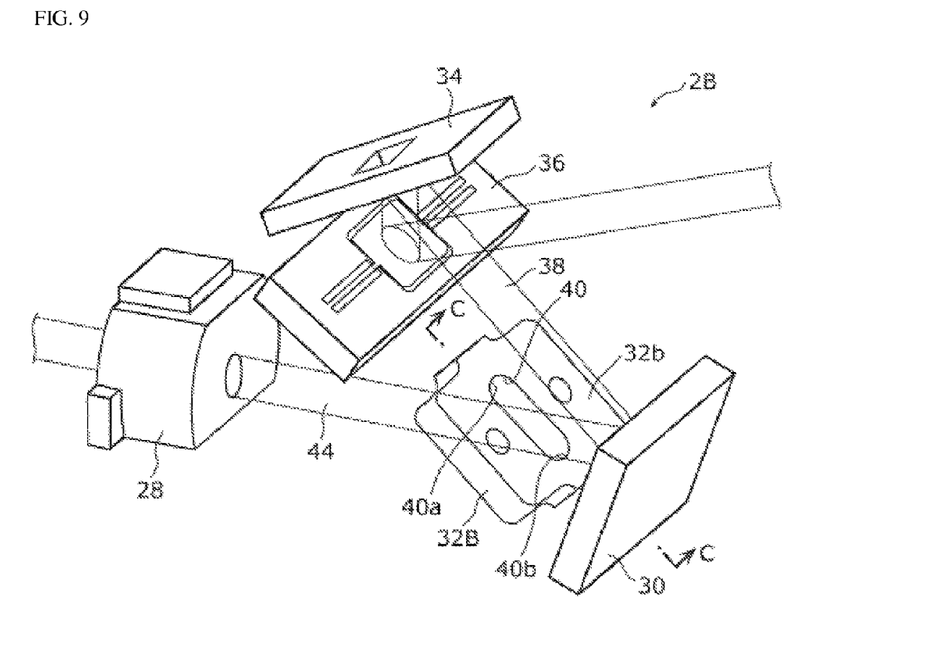
FIG. 9 is an oblique view illustrating part of the configuration of a projector according to one or more embodiments of the present invention.
Figure 10:
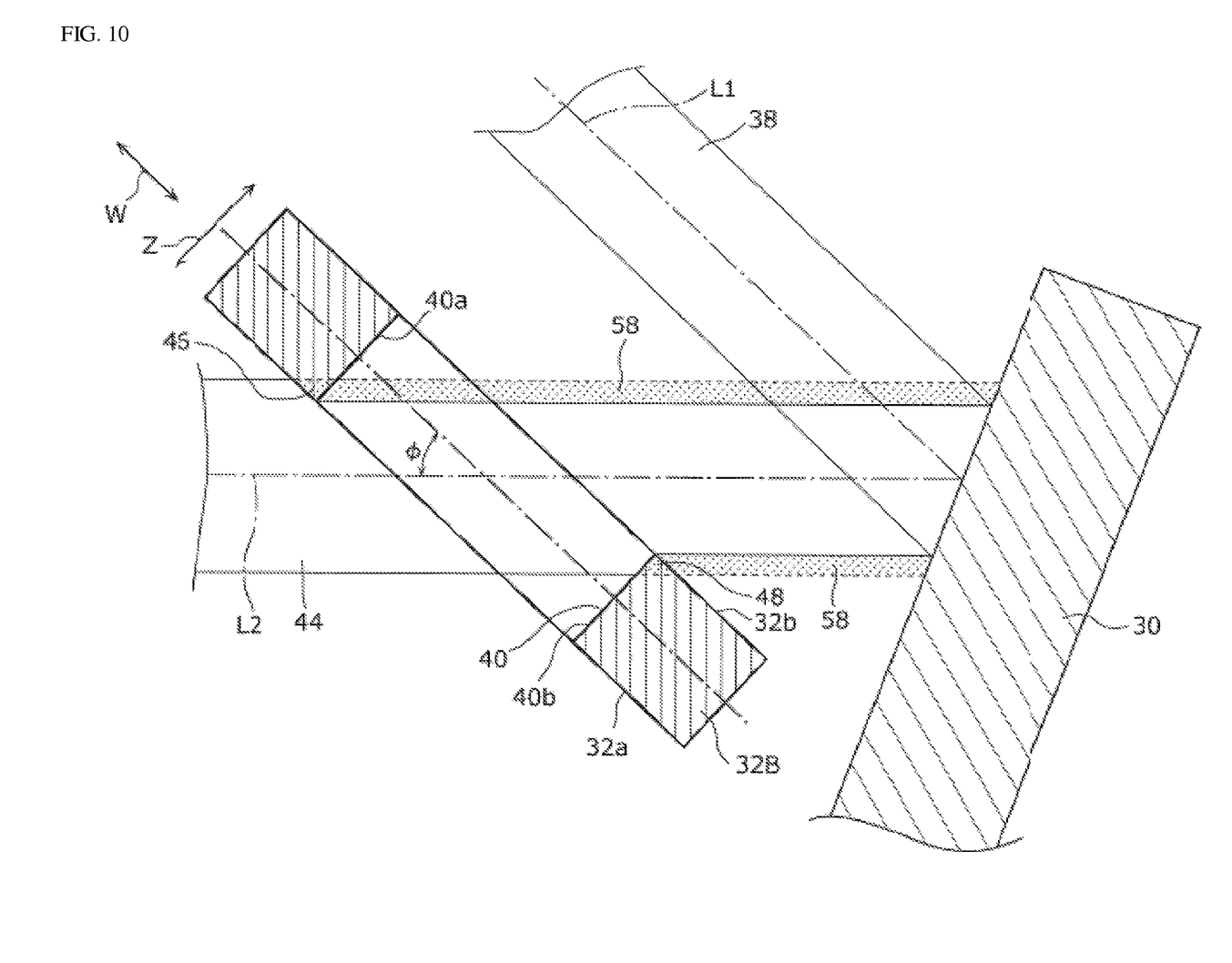
FIG. 10 is a cross-sectional view of key elements illustrating the diaphragm member and minor cut by line C-C in FIG. 9 according to one or more embodiments of the present invention.

The configuration of the projector pertaining to Example 3 will be described while referring to FIGS. 9 and 10. FIG. 9 is an oblique view illustrating part of the configuration of the projector pertaining to Example 3. FIG. 10 is a cross-sectional view of key elements illustrating the diaphragm member and mirror cut by line C-C according to one or more embodiments as shown in FIG. 9.

As shown in FIG. 9, the projector 2B according to one or more embodiments, a diaphragm member 32B may be arranged between the minor 30 and the lens 28 on the optical path L2 of the incident light 44 incident to the mirror 30.

As shown in FIG. 10, the diaphragm member 32B may be arranged such that the direction substantially perpendicular to its direction of thickness (direction indicated by arrows Z in FIG. 10) may be oblique by an angle of obliqueness φ with respect to the optical path L2 of the incident light 44. This angle of obliqueness φ may be set to an angle such that the diaphragm member 32B does not block the reflected light 38 reflected by the minor 30. Additionally, as shown in FIG. 10, the diaphragm member 32B according to one or more embodiments may be arranged such that the direction substantially perpendicular to its direction of thickness is substantially parallel to the optical path L1 of the reflected light 38.

According to one or more embodiments as shown in FIG. 10, the incident light 44 incident to the mirror 30 may be incident to the opening on the side of the first surface 32a of the aperture 40 (that is, the surface on the side where the incident light 44 is incident to the aperture 40), and may then be output toward the minor 30 from the opening on the side of the second surface 32b of the aperture 40 (that is, the surface on the side where the incident light 44 is output from the aperture 40). In this case, the range of flux of the incident light 44 may be restricted by the edge 46 on the side of the first surface 32a of the first end 40a in the long direction of the aperture 40, and may be restricted by the edge 48 on the side of the second surface 32b of the second end 40b in the long direction of the aperture 40. As a result, the stray light 58 contained in the incident light 44 may be removed.

Projectors pertaining to Examples 1-3 are described above, but the present invention is not limited to these examples. For example, it may be configured as a combination of the above examples.

In one or more embodiments, the case where the projector is mounted in a head-up display for an automobile is described, but it is not limited to this, and the projector may also be mounted in a head-up display for an aircraft.

In one or more embodiments, the case where the projector is mounted in a head-up display is described, but it is not limited to this, and the projector may be used as a projector for projecting an image on a screen mounted on a wall, etc.

In one or more embodiments, two MEMS minors (first MEMS minor and second MEMS minor) may be provided in the projector, but one MEMS minor that can be scanned in the horizontal direction and the vertical direction may be provided.

In one or more embodiments, laser light sources may be used as the light sources, but it is not limited to this, and LED (light emitting diode) light sources or the like may be used as the light sources.

In one or more embodiments, the aperture may extend from the first surface to the second surface penetrating through the diaphragm member substantially in parallel to the direction of thickness of the diaphragm member, but it is not limited to this, and the aperture may extend from the first surface to the second surface penetrating through, for example, the diaphragm member obliquely with respect to the direction of thickness of the diaphragm member (in other words, substantially in parallel to the optical path of the incident light or reflected light). Besides the above embodiments, the constitution of the present invention can variously be modified within the scope of the invention. In other words, the above embodiments are in all respects examples and should not be thought of as limitations. The invention should be understood to include all modifications of equivalent significance as the claims and belonging to the scope of the claims as discussed above. While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

One or more embodiments of the present invention may be used as a projector for projecting an image, for example. One of ordinary skill will appreciate that various other modifications and changes may be made to the disclosed embodiments without departing from the scope and spirit of the present invention.

DESCRIPTION OF REFERENCE NUMERALS 2, 2A, 2B Projectors
4 Automobile
6 Dashboard
8 Image
10 Windshield (projection surface)
12 Combiner
14 Driver
16 Scene
18 First laser light source
20 Second laser light source
22 Third laser light source
24 First dichroic minor
26 Second dichroic minor
28 Lens
30 Minor
32, 32A, 32B Diaphragm members
32a First surface
32b Second surface
34 First MEMS minor
36 Second MEMS minor
38 Reflected light
40 Aperture
40a First end
40b Second end
40c Third end
40d Fourth end
42 Controller
43 Housing
44 Incident light
46, 48 Edges
50, 58 Stray light
52, 54 Rotating shafts
56 Knob
L1, L2 Optical paths

What is claimed is:

1. A projector for projecting an image comprising:
a light source that outputs light;
a reflecting member that reflects the light from the light source; and
a diaphragm member having an aperture that restricts a range of flux of an incident light incident to the reflecting member, wherein:
the aperture penetrates through the diaphragm member along a direction of thickness of the diaphragm member,
the diaphragm member does not block a reflected light reflected by the reflecting member,
a direction perpendicular to the direction of thickness is oblique with respect to an optical path of the incident light, and
a reflecting surface of the reflecting member is oblique with respect to the optical path.

2. The projector of claim 1, wherein the diaphragm member is arranged so that the direction perpendicular to the direction of thickness is parallel to an optical path of the reflected light.

3. The projector of claim 2, wherein the diaphragm member further comprises:
a first surface on a side where the incident light is incident to the aperture; and
a second surface on a side where the incident light is output from the aperture, wherein:
the aperture is an elongated hole with a long direction that is substantially parallel to the optical path of the reflected light,
the range of flux of the incident light is restricted by an edge on the side of the first surface of a first end in the long direction of the aperture, and
the range of flux is restricted by an edge on the side of the second surface of a second end in the long direction of the aperture.

4. The projector of claim 2, wherein the diaphragm member adjusts an angle of obliqueness with respect to the optical path of the incident light that is perpendicular to the direction of thickness.

5. The projector of claim 2, further comprising a MEMS mirror that reflects the reflected light reflected by the reflecting member, wherein:
the diaphragm member is arranged between the reflecting member and a lens on the optical path of the incident light,
the diaphragm member does not block the incident light, and
the direction perpendicular to the direction of thickness is oblique with respect to the optical path of the incident light.

6. The projector of claim 1, wherein the diaphragm member further comprises:
a first surface on a side where the incident light is incident to the aperture; and
a second surface on a side where the incident light is output from the aperture, wherein:
the aperture is an elongated hole with a long direction along the optical path of the incident light,
the range of flux of the incident light is restricted by an edge on the side of the first surface of a first end in the long direction of the aperture, and
the range of flux is restricted by an edge on the side of the second surface of a second end in the long direction of the aperture.

7. The projector of claim 6, wherein the aperture extends, parallel to the direction of thickness, from the first surface to the second surface.

8. The projector of claim 7, wherein the diaphragm member adjusts an angle of obliqueness with respect to the optical path of the incident light that is perpendicular to the direction of thickness.

9. The projector of claim 7, further comprising a MEMS mirror that reflects the reflected light reflected by the reflecting member, wherein:
the diaphragm member is arranged between the reflecting member and the MEMS mirror on an optical path of the reflected light,
the diaphragm member does not block the incident light, and
the direction perpendicular to the direction of thickness is oblique with respect to the optical path of the reflected light.

10. The projector of claim 6, wherein the diaphragm member adjusts an angle of obliqueness with respect to the optical path of the incident light that is perpendicular to the direction of thickness.

11. The projector of claim 6, further comprising a MEMS mirror that reflects the reflected light reflected by the reflecting member, wherein:
- the diaphragm member is arranged between the reflecting member and the MEMS mirror on an optical path of the reflected light,
- the diaphragm member does not block the incident light, and
- the direction perpendicular to the direction of thickness is oblique with respect to the optical path of the reflected light.

12. The projector of claim 1, wherein the diaphragm member adjusts an angle of obliqueness with respect to the optical path of the incident light that is perpendicular to the direction of thickness.

13. The projector of claim 12, further comprising a MEMS mirror that reflects the reflected light reflected by the reflecting member, wherein:
- the diaphragm member is arranged between the reflecting member and the MEMS mirror on an optical path of the reflected light,
- the diaphragm member does not Hock the incident light, and
- the direction perpendicular to the direction of thickness is oblique with respect to the optical path of the reflected light.

14. The projector of claim 1, further comprising a MEMS mirror that reflects the reflected light reflected by the reflecting member, wherein:
- the diaphragm member is arranged between the reflecting member and the MEMS mirror on an optical path of the reflected light,
- the diaphragm member does not block the incident light, and
- the direction perpendicular to the direction of thickness is oblique with respect to the optical path of the reflected light.

* * * * *